Figure 1:
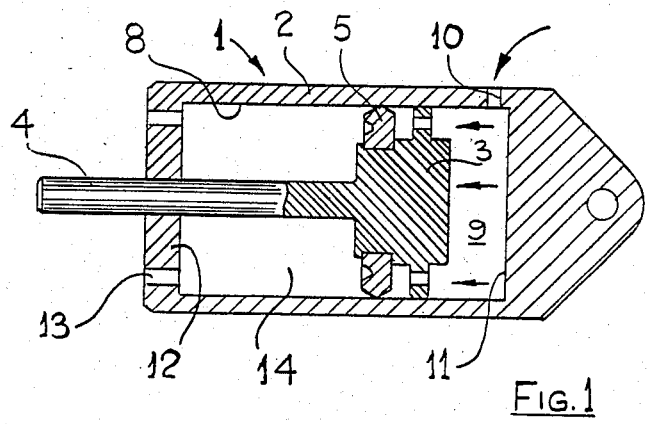

United States Patent [19]

Organ et al.

[11] Patent Number: 4,579,041

[45] Date of Patent: Apr. 1, 1986

[54] FLUID-PRESSURE OPERABLE DEVICES AND SEALING MEANS THEREFOR

[75] Inventors: Alan H. Organ, Cheltenham; Gavin S. Oseman, Malvern, both of England

[73] Assignee: Interlego A.G., Baar, Switzerland

[21] Appl. No.: 601,867

[22] Filed: Apr. 19, 1984

[30] Foreign Application Priority Data

May 4, 1983 [GB] United Kingdom ............... 8312166

[51] Int. Cl.$^4$ .................................. F15B 11/08
[52] U.S. Cl. ............................ 91/437; 137/854; 277/27; 277/165; 277/215
[58] Field of Search ............... 92/162 R, 240; 60/588, 60/589; 91/422, 437, 438; 137/843, 854; 277/3, 27, 165, 215

[56] References Cited

U.S. PATENT DOCUMENTS

| | | | |
|---|---|---|---|
| 2,444,569 | 7/1948 | Katcher . | |
| 3,391,646 | 7/1968 | Schlosser | 92/240 |
| 3,396,976 | 8/1968 | Reinhoudt | 92/162 R |
| 3,505,815 | 4/1970 | Wherry | 60/588 |
| 3,980,004 | 9/1976 | Jones | 92/240 |
| 3,994,208 | 11/1976 | Boyer | 92/240 |
| 4,116,452 | 9/1978 | Schanz | 92/240 |
| 4,262,759 | 4/1981 | Young | 277/205 |
| 4,417,503 | 11/1983 | Izumi | 92/240 |
| 4,492,082 | 1/1985 | Belart | 60/589 |

FOREIGN PATENT DOCUMENTS 7012963  9/1970  Fed. Rep. of Germany .

*Primary Examiner*—Abraham Hershkovitz
*Attorney, Agent, or Firm*—Kane, Dalsimer, Kane, Sullivan and Kurucz

[57] ABSTRACT

A fluid-pressure-operable device 1 includes two relatively-movable components 2, 3 defining a variable-volume working chamber 9. A sealing element 5 of elastomeric material is carried, or formed, by one of the components and is in sliding and sealing engagement with the other of the components normally to resist escape of fluid under pressure from chamber 9 to the exterior thereof. That face 15 of element 5 remote from the chamber is so provided with channel 16 that as pressure in the chamber increases the element is permitted progressively to deform and some of the material of the element thus displaced is then accommodated by the channel. When the pressure exceeds a predetermined value, deformation of the element is such that sealing engagement of the element with the other of said components is broken so that the pressure in chamber 9 is relieved to the exterior thereof.

6 Claims, 3 Drawing Figures

FLUID-PRESSURE OPERABLE DEVICES AND SEALING MEANS THEREFOR

This invention relates to fluid-pressure-operable devices and to sealing means therefor.

Hitherto in certain fluid-pressure-operable devices, where it has been particularly vital for reasons of safety that the build-up of fluid pressure in a working chamber of the device should not exceed a predetermined value, a pressure relief valve set at an appropriate value has been provided, for example fitted in a wall of the working chamber. Thus, when the predetermined pressure in that chamber is exceeded the relief valve has automatically opened to relieve the condition and to avoid any damage being sustained by the device. At the same time sealing means suitably engaged with, and disposed between the relatively-movable components of the device have maintained their sealing effect despite the build-up in pressure in the working chamber.

In fluid-pressure-operable devices, for example of piston-and-cylinder type, of relatively small size and for use at relatively low working pressures the provision of a pressure relief valve so fitted in a wall of the device has proved to be somewhat unwieldy and in consequence the device has lacked desired compactness. Further, the provision of the relief valve has added substantially to the cost of the device.

The invention as claimed is intended to provide a remedy. It solves this problem by providing a fluid-pressure-operable device in which the means for pressure relief is combined with the sealing means engaged with two relatively-movable components of the device.

According to this invention a fluid-pressure-operable device, which includes two relatively-movable components defining a variable-volume working chamber subjectable to fluid under pressure, is provided with a sealing element of elastomeric material which is carried, or formed, by one of said components and which is in sliding and sealing engagement with the other of said components normally to resist escape of fluid under pressure from said working chamber to the exterior thereof, and that face of said element remote from said working chamber being so provided with a channel or the like that as the pressure in said chamber increases the sealing element is permitted progressively to deform and some of the material of the element thus displaced being then accommodated by the channel or the like, whereby when said pressure exceeds a predetermined value the deformation of said sealing element is such that said sealing engagement of said element with said other of said components is broken so that the pressure in said working chamber is relieved to the exterior thereof.

The fluid-pressure-operable device may be of piston-and-cylinder type and in this case the sealing element may be of annular form suitably mounted upon the piston thereof and normally having peripheral line contact with the wall of the cylinder. The peripheral edge portion of the sealing element may be of V-shaped cross-section and said channel or the like may take the form of an annular groove generally of U-shaped cross-section or, alternatively, of other suitable cross-section.

Also according to the invention there is provided a sealing element of elastomeric material suitable for use in a fluid-pressure-operable device normally for sealing between two relatively-movable components thereof, said element being provided, on one face thereof which in operation of the device is unpressurised, with a channel or the like so that when fluid under pressure is applied to that face of said element opposite said one face, the element is permitted progressively to deform and some of the material of the element thus displaced is accommodated by the channel or the like whereby said pressure can be relieved past said element.

The advantages offered by the invention are mainly that by so designing the sealing element to both perform a sealing function and permit relief of excess pressure in said working chamber, a relatively compact fluid-pressure-operable device is provided.

Figure 2:
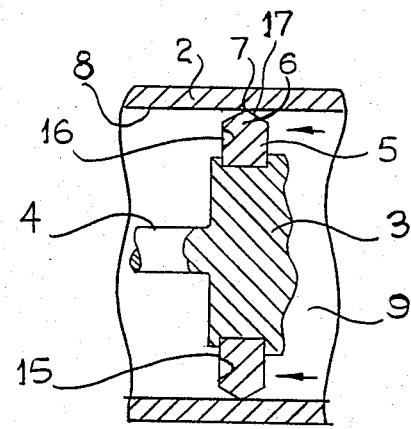
Figure 3:
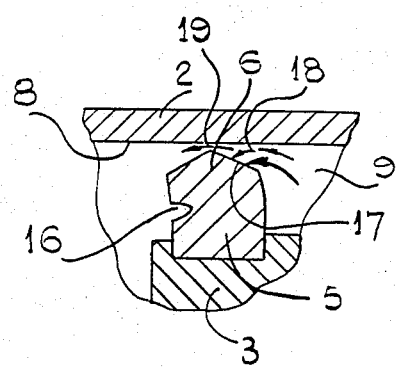

One way of carrying out the invention is described in detail below with reference to drawings which illustrate only one specific embodiment, in which:

FIG. 1 is a cross-sectional side elevation of a fluid-pressure-operable device in accordance with the invention, FIG. 2 is an enlarged cross-sectional view of the sealing element shown in FIG. 1 during normal sealing operation, and FIG. 3 is an enlargement of part of FIG. 2 and shows the sealing element permitting pressure relief from within the fluid-pressure-operable device.

The fluid-pressure-operable device 1 shown in the drawings is a jack of piston-and-cylinder type, the cylinder 2, the piston 3 and the piston rod 4 of which are of suitable plastics material.

An elastomeric sealing element 5 of rubber or rubber-like material is carried upon the piston 3 in the manner shown. The peripheral edge portion 6 of element 5 is of V-shaped cross-section so that around its periphery the element is normally in line engagement at 7 with the inner wall 8 of cylinder 2.

The device 1 is of single-acting type, compressed air being admitted to the working chamber 9 of cylinder 2 through a port 10 immediately adjacent the cylinder end wall 11. The other end wall 12 of the cylinder has ports 13 which place the annular chamber 14 to the left of piston 3 in communication with atmosphere.

As shown more clearly in FIG. 3 in its left-hand, unpressurised face 15, element 5 is provided with a channel in the form of an annular groove 16 of U-shaped cross-section. This groove effectively weakens the structure of the left-hand portion of the element 5 for the purpose now to be described.

In operation of the piston-and-cylinder device 1 when compressed air is admitted to the working chamber 9, the weakening of element 5 produced by groove 16 permits the element progressively to deform under the pressure applied to inclined peripheral surface 17 as indicated by the arrows 18 in FIG. 3. In consequence some of the elastomeric material of peripheral edge portion 6 which is normally disposed adjacent the groove 16 is therefore displaced into, thus being accommodated by, the groove.

When the pressure in chamber 9 reaches a predetermined value, for example in this embodiment 1½ bar, the deformation of the peripheral edge portion 6 reaches the condition shown in FIG. 3, in which the sealing engagement at 7 of element 5 with the wall 8 of the cylinder 2 is broken. Hence the pressure in the chamber 9 is relieved past the sealing element 5 to the chamber 14, as indicated by the arrow 19, and through ports 13 to atmosphere.

Thus, when the pressure in chamber 9 exceeds the predetermined value the element 5 no longer acts to seal but instead acts as a relief valve to ensure that no dangerous pressure condition prevails in chamber 9 which might cause failure of cylinder 2 and possible injury to users of the device.

When the pressure in chamber 9 falls back below the predetermined pressure the deformation of the element 5 becomes less and the line engagement of the element with wall 8 is restored whereupon device 1 can recommence to operate normally.

Although in the embodiment above described with reference to the drawings the sealing element is provided with a channel in the form of an annular groove 16 of U-shaped cross-section in its face 15, in alternative embodiments of the invention a groove of other suitable cross-section may instead be provided, or alternatively, that face may be provided with an annular slit of suitable width, depth and disposition, or, is otherwise suitably recessed around that face.

Further, although in the embodiment above described with reference to the drawings the device 1 is operable by compressed air, in alternative embodiments of the invention the device is instead operable under liquid pressure.

Again, the peripheral edge portion of the sealing element is not limited to the V-shaped cross-section shown in the drawings as in other embodiments it may be of other suitable cross-section, for example convex.

Although in the embodiment above described with reference to the drawings the fluid-pressure-operable device is of piston-and-cylinder type, in other embodiments the device may be of other suitable form, for example of semi-rotary type. Further, instead of being operable as jacks or actuators the devices may be operable as energy absorbers. In this case such devices are operable for recuperation thereof under fluid pressure temporarily generated therein, the sealing element in its relief valve mode preventing the pressure generated within the device from exceeding a predetermined value.

Finally, although in the embodiment above described with reference to the drawings said channel or the like provided in said sealing element is of annular form, in alternative embodiments of the invention the channel or the like is discontinuous in that it comprises a series of suitably-shaped recesses which are circumferentially spaced one from another around the unpressurised face of the sealing element.

We claim:

1. A fluid-pressure-operable device, including two relatively-movable components defining a variable-volume working chamber subjectable to fluid under pressure, said device being provided with a sealing element of elastomeric material which is carried, or formed, by one of said components and which is in sliding and sealing engagement with the other of said components normally to resist escape of fluid under pressure from said working chamber to the exterior thereof, said element having a peripheral edge portion with a convex cross-section difined by a front surface facing said working chamber and a rear surface remote from said working chamber with a U-shaped channel, said channel being constructed and arranged to permit said element to progressively deform as pressure within the working chamber increases, some of the material of the element thus displaced being accommodated by the channel, whereby when said pressure exceeds a predetermined value the deformation of said sealing element is such that said sealing engagement of said element with said other of said components is broken so that the pressure in said working chamber is relieved to the exterior thereof.

2. A device as claimed in claim 1, said device is of the piston-and-cylinder type.

3. A device as claimed in claim 2, wherein said sealing element is of annular form suitably mounted upon the piston of said device.

4. A device as claimed in claim 3, wherein said sealing element normally has peripheral line contact with the wall of the cylinder of said device.

5. A device as claimed in any one of the preceding claims, wherein said channel or the like takes the form of an annular groove.

6. A device as claimed in any one of claims 1, 2 or 3, wherein said channel or the like is discontinuous and comprises a series of recesses which are circumferentially spaced one from another around said face of said element remote from said working chamber.

* * * * *